United States Patent
Uematsu et al.

(10) Patent No.: US 10,732,602 B2
(45) Date of Patent: Aug. 4, 2020

(54) NUMERICAL CONTROL APPARATUS

(71) Applicant: Mitsubishi Electric Corporation, Chiyoda-ku (JP)

(72) Inventors: Masayuki Uematsu, Tokyo (JP); Tomoya Fujita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/565,519

(22) PCT Filed: May 12, 2015

(86) PCT No.: PCT/JP2015/063653
§ 371 (c)(1),
(2) Date: Oct. 10, 2017

(87) PCT Pub. No.: WO2016/181504
PCT Pub. Date: Nov. 17, 2016

(65) Prior Publication Data
US 2018/0074476 A1    Mar. 15, 2018

(51) Int. Cl.
*G05B 19/19*    (2006.01)

(52) U.S. Cl.
CPC .... *G05B 19/19* (2013.01); *G05B 2219/33274* (2013.01); *G05B 2219/35579* (2013.01)

(58) Field of Classification Search
CPC .......... G05B 19/19; G05B 2219/33274; G05B 2219/35579
(Continued)

(56) References Cited

U.S. PATENT DOCUMENTS 4,879,644 A * 11/1989 Gottshall .......... G05B 19/4141
                                                    700/56
5,940,292 A *  8/1999 Kurakake .......... G05B 19/4142
                                                    700/56
(Continued)

FOREIGN PATENT DOCUMENTS

JP    4-135210 A    5/1992
JP   10-124118 A    5/1998
(Continued)

OTHER PUBLICATIONS

International Search Report dated Aug. 11, 2015, in PCT/JP2015/063653, filed May 12, 2015.

*Primary Examiner* — Kenneth M Lo
*Assistant Examiner* — Mohammed Shafayet
(74) *Attorney, Agent, or Firm* — Xsensus LLP

(57) ABSTRACT

A numerical control apparatus includes: a numerical control unit that generates a command position; a drive control unit that is connected to the numerical control unit; and a signal measurement unit that is connected to the numerical control unit and the drive control unit. The drive control unit generates a command controlling a drive unit connected to a control target such that the control target follows the command position, and generates indicator signal data to be output to the numerical control unit and the signal measurement unit. The numerical control unit includes an arithmetic unit that performs processing of acquiring the indicator signal data as first indicator signal data and second indicator signal data, comparing the two indicator signal data, calculating a communication delay of the second indicator signal data with respect to the first indicator signal data, and determining input time of the measured signal.

6 Claims, 5 Drawing Sheets

(58) Field of Classification Search
USPC .......................................................... 700/56
See application file for complete search history.

(56) References Cited

U.S. PATENT DOCUMENTS

| | | | | |
|---|---|---|---|---|
| 6,625,498 | B1* | 9/2003 | Kurakake | G05B 19/0421 700/19 |
| 8,762,588 | B2 | 6/2014 | Hildebran et al. | |
| 8,850,092 | B2 | 9/2014 | Hildebran et al. | |
| 8,996,745 | B2 | 3/2015 | Decker et al. | |
| 9,152,136 | B2 | 10/2015 | Hildebran et al. | |
| 9,310,788 | B2 | 4/2016 | Hildebran et al. | |
| 9,323,235 | B2 | 4/2016 | Chaffee | |
| 9,377,770 | B2 | 6/2016 | Miyazaki et al. | |
| 9,384,569 | B2 | 7/2016 | Tezuka et al. | |
| 9,921,568 | B2* | 3/2018 | Nagaoka | G05B 19/4062 |
| 2002/0086668 | A1* | 7/2002 | Ferianz | H04L 5/023 455/423 |
| 2003/0095667 | A1* | 5/2003 | Watts | H04R 3/005 381/56 |
| 2003/0191553 | A1* | 10/2003 | Isohata | G05B 19/4142 700/170 |
| 2005/0159836 | A1* | 7/2005 | Sugiyama | G05B 19/408 700/181 |
| 2005/0174086 | A1 | 8/2005 | Iwashita et al. | |
| 2006/0136088 | A1* | 6/2006 | Sato | G05B 19/19 700/159 |
| 2007/0047687 | A1* | 3/2007 | Hsu | H03D 13/004 375/375 |
| 2008/0051927 | A1* | 2/2008 | Prestidge | G05B 19/401 700/195 |
| 2008/0238351 | A1* | 10/2008 | Aoyama | G05B 19/4148 318/569 |
| 2009/0033271 | A1* | 2/2009 | Hon | G05B 19/402 318/640 |
| 2009/0292503 | A1* | 11/2009 | Hon | B23Q 17/22 702/168 |
| 2010/0030368 | A1* | 2/2010 | Hon | G01B 5/20 700/195 |
| 2010/0101105 | A1* | 4/2010 | Hon | B23Q 17/20 33/503 |
| 2011/0276173 | A1* | 11/2011 | Otsuki | G05B 19/4103 700/173 |
| 2013/0166044 | A1* | 6/2013 | Hon | B23Q 17/20 700/61 |
| 2013/0245788 | A1* | 9/2013 | Miyazaki | G05B 19/18 700/11 |
| 2014/0228998 | A1* | 8/2014 | Jiang | G05B 19/19 700/186 |
| 2014/0243999 | A1 | 8/2014 | Hildebran et al. | |
| 2014/0244024 | A1* | 8/2014 | Tezuka | G05B 19/188 700/180 |
| 2014/0365015 | A1 | 12/2014 | Hildebran et al. | |
| 2014/0371877 | A1 | 12/2014 | Hildebran et al. | |
| 2015/0046742 | A1 | 2/2015 | Hata | |
| 2015/0168941 | A1* | 6/2015 | Oota | G05B 19/406 318/569 |
| 2016/0026165 | A1 | 1/2016 | Decker et al. | |

FOREIGN PATENT DOCUMENTS

| | | |
|---|---|---|
| JP | 2001-22419 A | 1/2001 |
| JP | 2002-312011 A | 10/2002 |
| JP | 2005-229668 A | 8/2005 |
| JP | 3772052 B2 | 5/2006 |
| JP | 2013-51605 A | 3/2013 |
| JP | 2013-84111 A | 5/2013 |
| JP | 2013-175073 A | 9/2013 |
| JP | 2013-196307 A | 9/2013 |
| JP | 2015-35158 A | 2/2015 |

* cited by examiner

FIG.6

| STRING No. | TIME | DETECTED POSITION D1 | MEASURED SIGNAL S1 |
|---|---|---|---|
| 1 | $T_1$ | $D1_1$ | $S1_1$ |
| 2 | $T_2$ | $D1_2$ | $S1_2$ |
| 3 | $T_3$ | $D1_3$ | $S1_3$ |
| 4 | $T_4$ | $D1_4$ | $S1_4$ |
| ⋮ | ⋮ | ⋮ | ⋮ |

NUMERICAL CONTROL APPARATUS

FIELD

The present invention relates to a numerical control apparatus that controls a machine having a servo motor as a drive source.

BACKGROUND

Conventional machine tool and robotic apparatus use a numerical control apparatus to perform control such that the position of a drive shaft follows a command, but the position detected by a position sensor is different from the position of a part originally intended to be controlled. For example, a parameter acquired by a position sensor of a machine tool is a parameter of the angle of rotation of a motor or the position of a table or a spindle head mechanically connected to the motor. However, an implement end which is the part originally intended to be controlled is a workpiece fixed to the table or the tip of a tool attached to the spindle. Accordingly, the implement end which is the part originally intended to be controlled does not follow a command position perfectly even when it is controlled to follow the command position while feeding back the value acquired by the position sensor, whereby a desired machining result may not be obtained.

Moreover, for example, a machining point at which the workplace is in contact with the tool or the motor itself generates heat to become a heat source, and this heat is transmitted to the apparatus and causes minute deformation of the apparatus, whereby a desired machining result may not be obtained. A test operation is thus performed by attaching a measuring ins eminent to the implement end at the time of adjustment and maintenance of the apparatus, so that the numerical control apparatus addresses the above situation by performing correction processing that corrects a deviation between the detected position obtained from the position sensor on the basis of a measured result of the test operation and an actual position of the implement end, as well as corrects a shift in the position of the implement end caused by the deformation of the apparatus. In order to accurately perform the above correction processing, it is desirable that information from an external measuring instrument and information from the position sensor communicated within the numerical control apparatus are obtained in synchronization with each other timewise, where an example of such method is disclosed in Patent Literature 1.

A controller described in a first embodiment of Patent Literature 1 uses an unused analog signal input unit of a servo amplifier to acquire a signal via a communication unit connecting the servo amplifier and a numerical control apparatus, and thus acquires a signal obtained from a position sensor or a speed sensor of the servo motor in synchronization with a signal obtained from an external measuring instrument. Such a controller however has a problem that the number of external measuring instruments allowed to perform measurement at the same time is limited to the number of unused analog signal input units included in the servo amplifier. A controller described in a second embodiment of Patent Literature 1 solves this problem by providing an interface circuit unit that acquires a signal from an external measuring instrument. However, such a controller communicates a signal from the external measuring instrument to a control unit via a communication unit connecting a servo amplifier and a numerical control apparatus, where an attempt to acquire many signals at the same time such as when a plurality of external measuring instruments is used causes an increase in the communication load. This communication unit with the increased communication load is originally used by the control unit to communicate a command position that controls the driving of the servo motor to the servo amplifier, and by the servo amplifier to communicate a signal from a position sensor or speed sensor of the servo motor to the control unit in order to feed back the signal. The communication unit thus transmits and receives data in a short communication cycle in order to control the servo motor at a high speed.

CITATION LIST

Patent Literature

Patent Literature 1: Japanese Patent Application Laid-Open No. 2001-22419

SUMMARY

Technical Problem

According to the technique described in the second embodiment of Patent Literature 1 being the aforementioned conventional technique, the attempt to acquire many signals at the same time as in using a plurality of external measuring instruments causes an increase in the communication load on the communication unit that performs communication necessary to control the driving of a control target. This obstructs the communication to control the driving of the control target and thus possibly hinders the essential operation of the control target.

The present invention has been made in view of the above problems, and it is an object of the present invention to provide a numerical control apparatus which does not affect the essential operation of a control target with no obstruction to communication that controls the driving of the control target.

Solution to Problem

To solve the problems and achieve the object, the present invention provides a numerical control apparatus including: a numerical control unit to generate a command position for a control target: a drive control unit to be connected to the numerical control unit via a first communication unit: and a signal measurement unit to be connected to the numerical control unit via a second communication unit, and connected to the drive control unit via a third communication unit. The drive control unit generates a command controlling a drive unit connected to the control target such that the control target follows the command position, and generates indicator signal data to be output to the numerical control unit via the first communication unit and at the same time to the signal measurement unit via the third communication unit. The numerical control unit includes an arithmetic unit to perform processing of acquiring the indicator signal data as first indicator signal data via the first communication unit and as second indicator signal data via the signal measurement unit and the second communication unit, comparing the first indicator signal data and the second indicator signal data, calculating a communication delay of the second indicator signal data with respect to the first indicator signal data, and determining input time of a measured signal.

Advantageous Effects of Invention

The present invention can obtain the numerical control apparatus which does not affect the essential operation of the control target with no obstruction to the communication that controls the driving of the control target.

BRIEF DESCRIPTION OF DRAWINGS

FIG. 6 is a table data illustrating combinations of the time data, the detected position data, and data of a resampled measured signal, that are stored in a storage unit, according to the third embodiment.

DESCRIPTION OF EMBODIMENTS

A numerical control apparatus according to an embodiment of the present invention will now be described in detail with reference to the drawings. Note that the present invention is not to be limited to the embodiment.

First Embodiment

Figure 1:
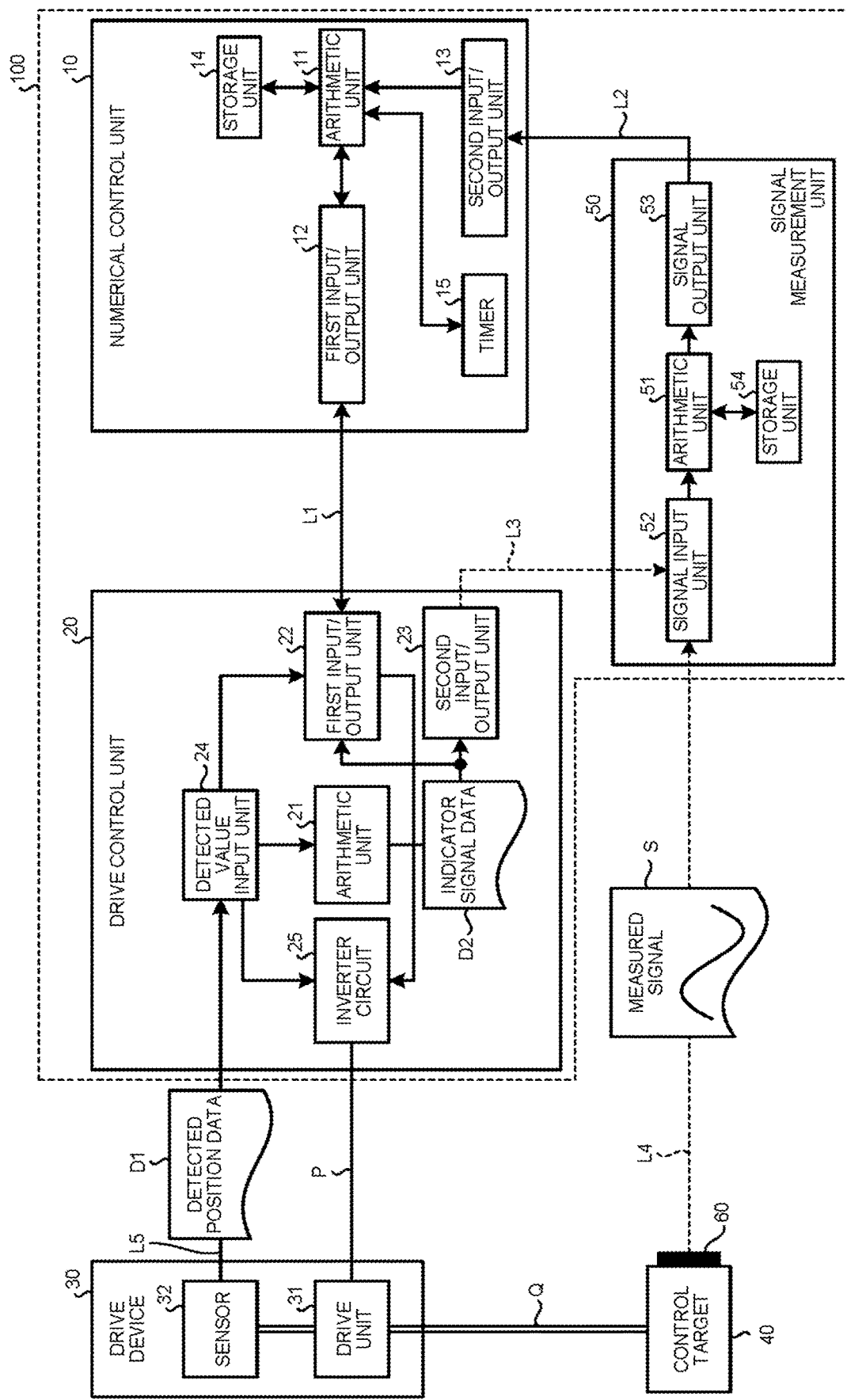
FIG. 1 is a block diagram illustrating the configuration of a numerical control apparatus and its periphery according to a first embodiment.

FIG. 1 is a block diagram illustrating the configuration of at numerical control apparatus and its periphery according to a first embodiment of the present invention. A numerical control apparatus 100 illustrated in FIG. 1 includes a numerical control unit 10 that generates a command position for a control target 40, a drive control unit 20 that is connected to the numerical control unit 10 via a communication line L1 being a first communication unit, and a signal measurement unit 50 that is connected to the numerical control unit 10 via a communication line L2 being a second communication unit. The drive control unit 20 generates a command that controls a drive unit 31 connected to the control target 40 such that the control target 40 follows the command position, and also causes the numerical control unit 10 to output a measured signal acquired by the signal measurement unit 50. The numerical control unit 10 includes an arithmetic unit 11 that performs processing of acquiring indicator signal data D2 generated and output by the drive control unit 20 as first indicator signal data D21 via the communication line L1 being the first communication unit and as second indicator signal data D22 via the signal measurement unit and the communication line L2 being the second communication unit, comparing the first indicator signal data D21 and the second indicator signal data D22, calculating a communication delay of the second indicator signal data D22 with respect to the first indicator signal data D21, and determining input time of the measured signal.

The drive control unit 20 is connected to the signal measurement unit 50 via a communication line L3 being a third communication unit, and includes: a first input/output unit 22 that outputs the first indicator signal data D21 to the numerical control unit 10 via the communication line L1 being the first communication unit and a second input/output unit 23 that outputs the second indicator signal data D22 to the signal measurement unit 50 via the communication line L3 being the third communication unit. The second input/output unit 23 includes a digital-to-analog converter that outputs the second indicator signal data D22 as an analog value. Such a configuration allows output of an indicator signal used for time synchronization via different communication units.

A drive device 30 includes the drive unit 31 and a sensor 32 that detects a quantity of state of at least one of the position, speed, and current of the drive unit 31 and outputs the quantity of state being detected to the drive control unit 20. In the following description, the sensor 32 is described as a position sensor but is not limited thereto.

The numerical control unit 10 includes the arithmetic unit 11, a first input/output unit 12, a second input/output unit 13, a storage unit 14, and a timer 15. The drive control unit 20 includes an arithmetic unit 21, the first input/output, unit 22 connected to the first input/output unit 12 of the numerical control unit 10 via the communication line L1, the second input/output unit 23, a defected value input unit 24, and an inverter circuit 25. The drive device 30 includes the drive unit 31 and the sensor 32 connected to the detected value input unit 24 of the drive control unit 20 via a communication line L5. The drive unit 31 is connected to the inverter circuit 25 via a power line P, and is connected to the control target 40 via a drive shaft Q. The signal measurement unit 50 includes an arithmetic unit 51, a signal input unit 52 connected to the second input/output unit 23 of the drive control unit 20 via the communication line L3, a signal output unit 53 connected to the second input/output unit 13 of the numerical control unit 10 via the communication line L2, and a storage unit 54. A measuring instrument 60 connected to the signal input unit 52 of the signal measurement unit 50 via a communication line L4 is attached to the control target 40.

Note that in FIG. 1, the communication lines L1, L2, and L5 used to communicate digital signals are indicated by solid arrows, and the communication lines L3 and L4 used to communicate analog signals are indicated by dashed arrows.

Next, the operation of the numerical control apparatus illustrated, in FIG. 1 will be described. The arithmetic unit 11 of the numerical control unit 10 generates a position command of the drive unit 31 by using a program that is stored in the storage unit 14 and controls the movement of the control target 40, and then outputs the position command to the first input/output unit 22 of the drive control unit 20 via the first input/output unit 12 and the communication line L1.

On the basis of the position command acquired by the first input/output unit 22 and detected position data D1 of the drive unit 31 acquired by the detected value input unit 24, the drive control unit 20 controls the inverter circuit 25 such that the movement of the control target 40 follows the position command generated by the arithmetic unit 11, and supplies drive power to the drive unit 31 via the power line P connected to the inverter circuit 25.

The drive device 30 drives the drive unit 31 with the drive power supplied from the drive control unit 20 via the power line P, and moves the control target 40 through the drive shaft Q mechanically connected to the drive unit 31. Here, the drive shaft Q may transmit the drive of the drive unit 31 to the control target 40 directly or upon converting the drive of the drive unit 31. When the drive unit 31 is a servo motor and the drive shaft Q is a ball screw, for example, the drive of the drive unit 31 being at rotational motion is converted into a linear translational motion by the drive shaft Q and then transmitted to the control target 40.

The sensor 32 detects the position of the drive unit 31 and outputs the value of the detected position as the detected position data D1 to the drive control unit 20 via the communication line L5 being the fifth communication unit. Here, the sensor 32 detects the position as the quantity of state of the drive unit 31, but may detect the speed of the drive unit 31 or the current value of the drive power supplied to the drive unit 31. Alternatively, the sensor 32 may be configured to detect two or more of the position, speed, and current value.

The numerical control unit 10 and the drive control unit 20 each operate at a fixed cycle, and the operation cycles of these units are synchronized with each other via the communication line L1. The operations of the inverter circuit 25 and the detected value input unit 24 follow the operation cycle of the numerical control unit 10 and the drive control unit 20. This operation cycle is thus a control cycle of the numerical control apparatus 100 controlling the movement of the control target 40. It is desirable that the numerical control unit 10 and the drive control unit 20 perform communication via the communication line L1 in a cycle that is in synchronization with the control cycle or a cycle that is in synchronization with the control cycle and is an integer multiple of the control cycle.

The timer 15 starts timing at the start of control by a program that controls the movement of the control target 40. The arithmetic unit 11 stores time counted by the timer 15 in the storage unit 14 every control cycle. The operation of the timer 15 and the storing of time into the storage unit 14 are stopped at the same time as the termination of the program that controls the movement of the control target 40.

Here, for the sake of simplicity, FIG. 1 illustrates the configuration where one drive control unit 20 and one drive device 30 are provided for one numerical control unit 10, and the control target 40 has one drive shaft Q. However, the present invention is not limited to such configuration. The present invention may be configured such that the control target has two or more drive shafts, the drive device and the drive control unit each equal in number to the number of the drive shafts are provided, and the first input/output unit of each drive control unit is connected to a plurality of first input/output units of the numerical control unit in parallel via communication lines.

The arithmetic unit 21 monitors a temporal change of the detected position data D1 acquired by the sensor 32, determines a change in the detected position data D1 which is characteristic in the operation of the drive unit 31, and uses this as a trigger to generate pulse signal data. Here, the characteristic change in the detected position data D1 can occur in an operation where the drive unit 31 starts driving from rest to cause an update of the value of the detected position data D1 to a value deviating from the value at rest by a preset value d. The pulse signal data generated by the arithmetic unit 21 is output as the first indicator signal data D21 to the numerical control unit 10 via the first input/output unit 22 of the drive control unit 20 and the communication line L1. The indicator signal is exclusively output in the form of a pulse to be able to facilitate time synchronization processing.

The drive control unit 20 further includes the second input/output unit 23 that performs digital-to-analog conversion on data processed inside the drive control unit 20, which is represented by the detected position data D1 and command position data acquired from the numerical control unit 10, and outputs the data being converted. The drive control unit 20 outputs the second indicator signal data D22 to the signal measurement unit 50 via the second input/output unit 23 and the communication line L3.

The signal input unit 52 included in the signal measurement unit 50 includes an analog-to-digital conversion circuit that converts a plurality of analog signals acquired at a fixed sampling period into digital signals and outputs the digital signals. The signal input unit 52 performs analog-to-digital conversion on at least an analog signal of the second indicator signal data D22 acquired from the drive control unit 20 via the communication line L3, and a measured signal S being an analog signal acquired from the measuring instrument 60 via the communication line L4. The signals converted into digital form by the signal input unit 52 are stored as a set in the storage unit 54 for each period of the sampling period. The sampling period of the signal input unit 52 is desirably shorter than a data update period of the signal output by the second input/output unit 23 of the drive control unit 20, and shorter than half the data update period.

Communication between the signal output unit 53 of the signal measurement unit 50 and the second input/output unit 13 of the numerical control unit 10 via the communication line L2 is performed in synchronization with the control cycle, at which the numerical control unit 10 and the drive control unit 20 are operated, and performed at a cycle equal to the control cycle or a cycle obtained by multiplying the control cycle by a power of two. Here, the power of two can be two-fold, four-fold, or eight-fold. Communication via the communication line L2 is performed for the first time at the start of the control by the program that controls the movement of the control target 40, and is performed for the last time at a timing closest to the end of the control by the program, where no communication is performed after the control by the program is completed.

Note that, although FIG. 1 illustrates only one measuring instrument 60, the present invention is not limited to such configuration. The present invention may be configured such that a plurality of measuring instruments measures the state of the control target 40, each of the plurality of measuring instruments and the signal input unit 52 are individually connected via a communication line, and a plurality of measured signals S is sampled at the same time.

The signal output unit 53 outputs sampling data, which is stored in the storage unit 54 since the last communication, to the numerical control unit 10 via the communication line L2 at every communication cycle of the second input/output unit 13 of the numerical control unit 10. The sampling data that has been output is deleted to secure a storage area in the storage unit 54 or overwritten with newly sampled data. The signal input unit 52 continues to sample the second indicator signal data D22 and the measured signal S converted into analog form while the signal output unit 53 outputs data to the numerical control unit 10.

In order to store the sampled signals without any shortage timewise, the storage unit 54 has the storage area larger than the total number of data of signals sampled in one cycle of the communication cycle between the signal output unit 53 and the second input/output unit 13 of the numerical control unit 10. The storage area of the storage unit 54 is desirably twice or more the total number of data of the signals sampled in one cycle of the communication cycle between the signal output unit 53 and the second input/output unit 13 of the numerical control unit 10.

The numerical control unit 10 acquires the first indicator signal data D21 from the first input/output unit 12 as well as the data sampled by the signal measurement unit 50 from the second input/output unit 13 and stores the data in the storage unit 14, the data sampled being the measured signal S and the second indicator signal data D22 converted into analog form.

The data acquired by the numerical control unit 10 from the first input/output unit 12 via the communication line L1 is stored in the storage unit 14 in association with time counted by the timer 15 at the time the data is acquired. Here, the data acquired by the numerical control unit 10 from the first input/output unit 12 via the communication line L1 is represented by the detected position data D1 and the first indicator signal data D21. The data acquired as described above via the communication line L1 is thus handled as data strings in synchronization with each other timewise.

In the numerical control unit 10, the second indicator signal data D22 and the measured signal S are acquired as data strings for each communication cycle of communication performed via the second input/output unit 13 and the communication line L2. These two data strings acquired via the communication lines L1 and L2 are analog signals acquired every sampling period of the analog-to-digital conversion circuit included in the signal input unit 52 of the signal measurement unit 50. In each of the plurality of data strings, each adjacent data is at a time interval equal to the sampling period of the signal input unit 52. Head data in the data string acquired in the initial communication via the communication line L2, which is performed at the start of the control by the program that controls the movement of the control target 40, is stored in the storage unit 14 in association with time counted by the timer 15 at the time of the communication. The storage unit 14 stores in advance the sampling period of the signal input unit 52 of the signal measurement unit 50 as a parameter, so that the head data is stored in the storage unit 14 in association with a value obtained by adding the time of the sampling period to the time associated with data preceding each data.

Figure 2:
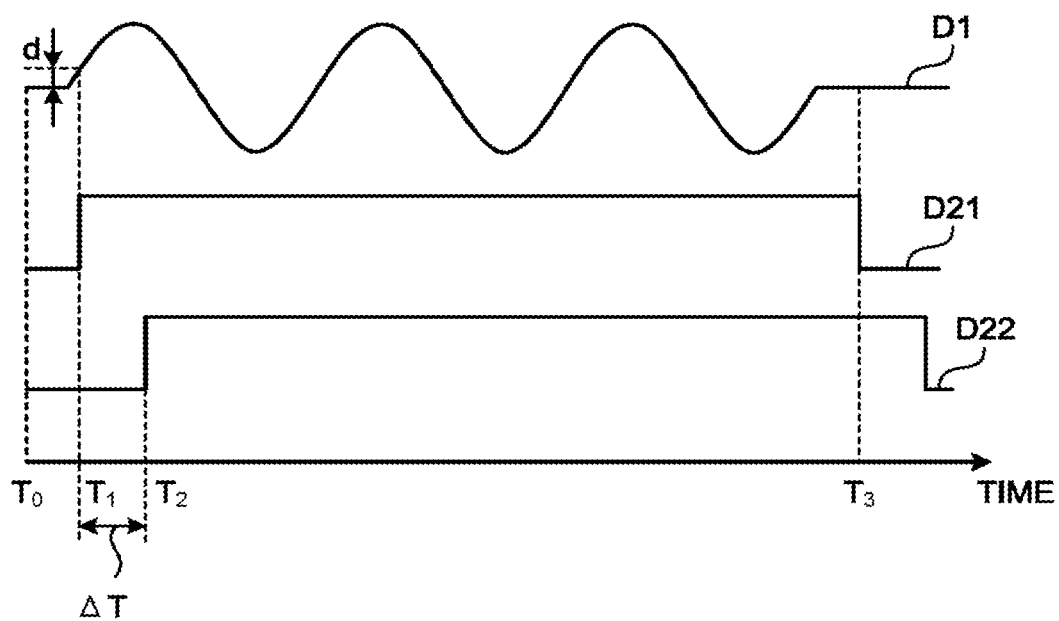
FIG. 2 is a graph illustrating detected position data and two indicator signal data with a horizontal axis representing time, according to the first embodiment.

FIG. 2 is a graph illustrating the detected position data and two indicator signal data with a horizontal axis representing time. Specifically, with the horizontal axis representing time counted by the timer 15, the graph illustrates the detected position data D1 and the first indicator signal data D21 acquired from the first input/output unit 12 and the second indicator signal data D22 acquired from the second input/output unit 13. Here, the graph illustrates the detected position data detected by the sensor 32 when the drive unit 31 is a servo motor, the drive shaft Q is a ball screw, and the control target 40 is smoothly driven three times in reciprocation.

In FIG. 2, time $T_0$ is the time when the program for controlling the movement of the control target 40 is started, time $T_1$ is the time when the pulse waveform of the first indicator signal data D21 rises, time $T_2$ is the time when the pulse waveform of the second indicator signal data D22 rises, and time $T_3$ is the time when the program for controlling the movement of the control target 40 is completed.

The waveform of the first indicator signal data D21 and the waveform of the second indicator signal data D22 are the waveforms of originally the same indicator signal data D2, whereby the waveforms plotting the data strings of the two are congruent. However, the second indicator signal data D22 includes the time required for the second input/output unit 23 of the drive control unit 20 to perform digital-to-analog conversion and a time lag caused by a possible mismatch between time data associated with the head data in the data string acquired in the initial communication of the communication performed via the communication line L2 and the time when the data is actually sampled, thereby resulting in the occurrence of a signal delay by time $\Delta T$.

The arithmetic unit 11 evaluates the first indicator signal data D21 stored in the storage unit 14, performs processing that determines the rise time of the first indicator signal data D21, and stores time data associated with the data as time $T_1$ in the storage unit 14. Similarly, the arithmetic unit 11 evaluates the second indicator signal data D22 stored in the storage unit 14, performs processing that determines the rise time of the second indicator signal data D22, and stores time data associated with the data as time $T_2$ in the storage unit 14.

The delay time of the signal included in the data string of the second indicator signal data D22 is calculated from time $\Delta T$ which is the difference between time $T_2$ and time $T_1$. A value obtained by subtracting the delay time from each value of the time data string associated with the second indicator signal data D22 is updated as a value of the time data associated with the second indicator signal data D22. As a result, the time delay included in the second indicator signal data D22 and the data of the measured signal S is corrected, and the time data associated with the measured signal S represents the time when the measured signal S is measured by the measuring instrument 60, namely the time not including any delay, whereby it is possible to compare values of the data communicated between the numerical control unit 10 and the drive control unit 20 as with the first detected position data D1 and the command position.

As described above, the present embodiment can correct the delay of the data of the measured signal and obtain the data in synchronization with the correct time. The present embodiment can also perform measurement without increasing the communication load on the communication line even at the time of simultaneously measuring a plurality of different measured signals by using a plurality of measuring instruments.

Second Embodiment

Figure 3:
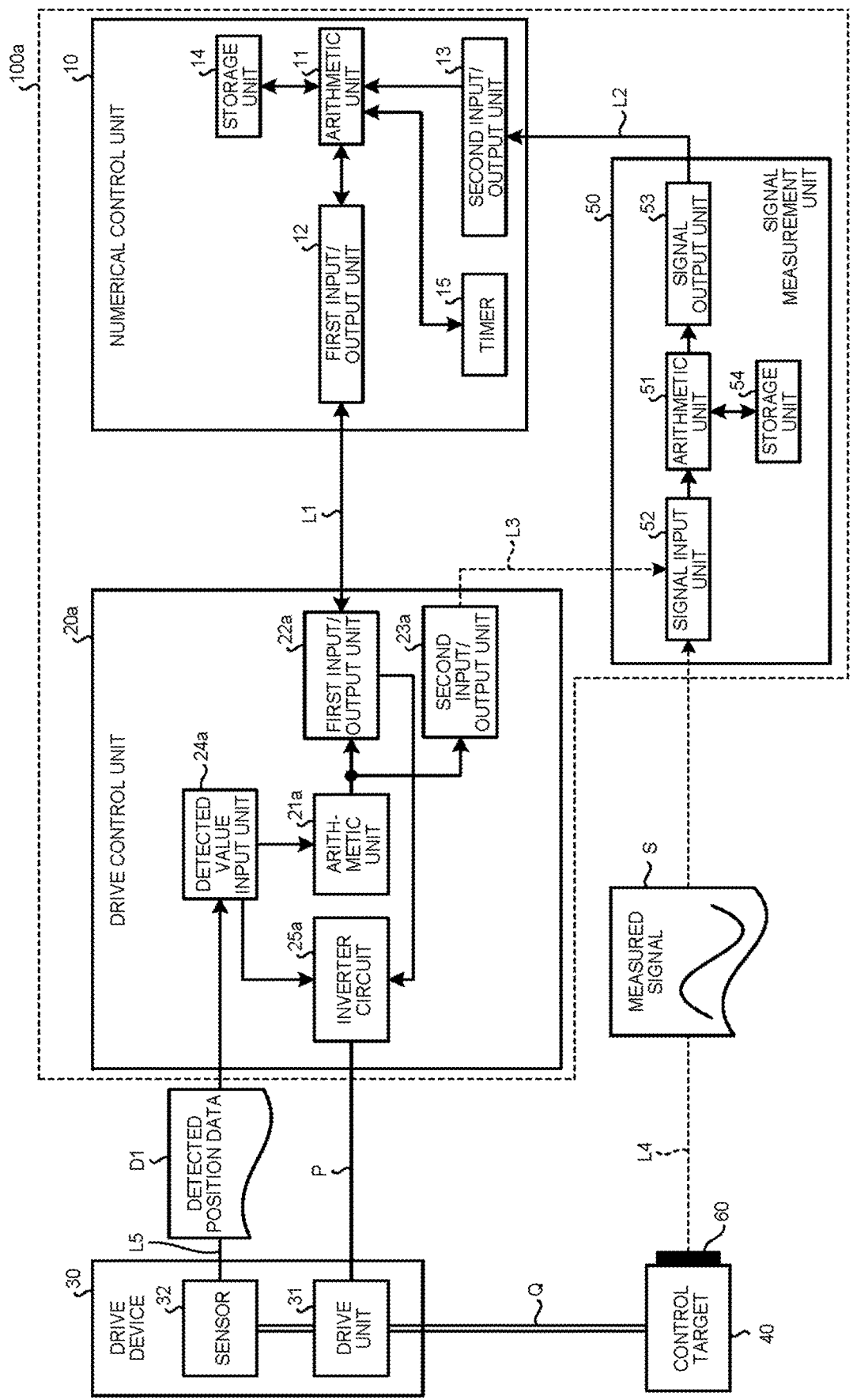
FIG. 3 is a block diagram illustrating the configuration of a numerical control apparatus and its periphery according to a second embodiment.

FIG. 3 is a block diagram illustrating the configuration of a numerical control apparatus and its periphery according to a second embodiment of the present invention. A numerical control apparatus 100a illustrated in FIG. 3 is identical to the numerical control apparatus illustrated in FIG. 1 except that a drive control unit 20a is included instead of the drive control unit 20 of the numerical control apparatus illustrated in FIG. 1.

In the drive control unit 20a of the numerical control apparatus 100a illustrated in FIG. 3, an arithmetic unit 21a communicates detected position data D1 from a first input/output unit 22a to a numerical control unit 10 without generating indicator signal data D2 from the value of the detected position data D1 acquired from a detected value input unit 24a, and at the same time performs digital-to-analog conversion on the detected position data D1 in a second input/output unit 23a and outputs the data to a signal measurement unit 50.

The signal measurement unit 50 performs analog-to-digital conversion on a measured signal S measured by a measuring instrument 60 and the detected position data D1 converted into analog form, samples the signal data being converted, and communicates the sampled signal data to the numerical control unit 10. The numerical control unit 10 then acquires the measured signal S being sampled and detected position data Dl2 obtained by sampling the detected position data D1 converted into analog form from a second input/output unit 13, acquires the detected position data D1 from a first input/output unit 12, and stores these data into a storage unit 14.

Figure 4:
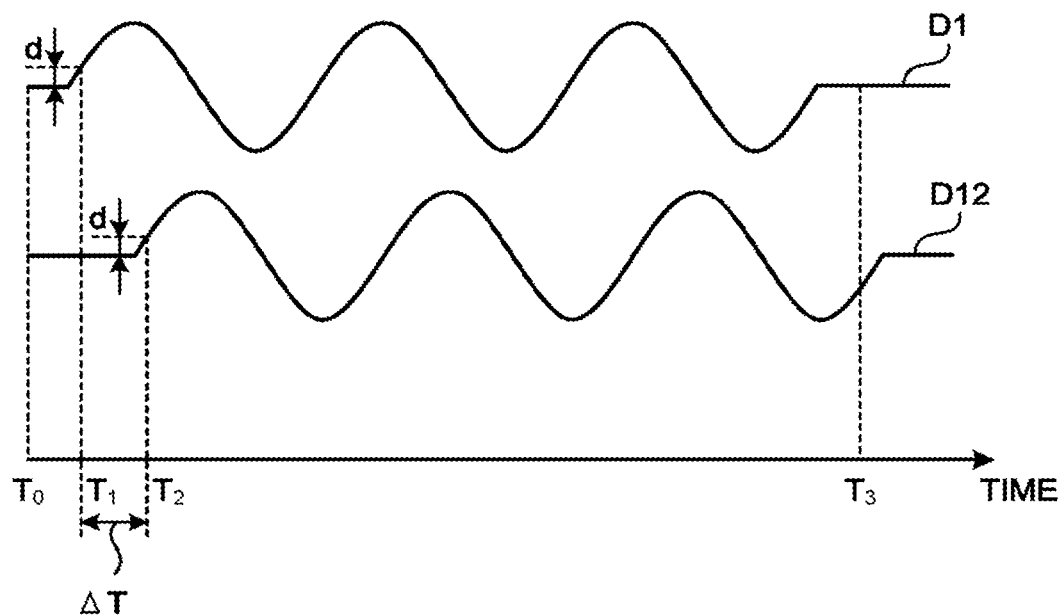
FIG. 4 is a graph illustrating two detected position data with a horizontal axis representing time, according to the second embodiment.

FIG. 4 is a graph illustrating two detected position data with a horizontal axis representing time. Specifically, with the horizontal axis representing time counted by a timer 15, the graph illustrates the detected position data D1 acquired from the first input/output unit 12 and the detected position data D12 acquired from the second input/output unit 13. Here, the graph illustrates the detected position data detected by a sensor 32 when a drive unit 31 is a servo motor, a drive shaft Q is a ball screw, and a control target 40 is smoothly driven three times in reciprocation.

In FIG. 4, time $T_0$ is the time when a program for controlling the movement of the control target 40 is started, time $T_1$ is the time when the value of the detected position data D1 is increased by a value d from the initial value, time $T_2$ is the time when the value of the detected position data D12 is increased by a value d from the initial value, and time $T_3$ is the time when the program for controlling the movement of the control target 40 is completed. Here, the value d is a threshold related to the values of the detected position data D1 and D12, and is an arbitrary value set in advance and stored in the storage unit 14 of the numerical control unit 10.

The detected position data D12 originally being the detected position data D1, the waveforms plotting data strings of the two are congruent. However, the detected position data D12 includes the time required for the second input/output unit 23a of the drive control unit 20a to perform digital-to-analog conversion and a time lag caused by a possible mismatch between time data associated with head data in the data string acquired in the initial communication of the communication performed via a communication line L2 and the time when the data is actually sampled, thereby resulting in the occurrence of a signal delay by time ΔT.

An arithmetic unit 11 evaluates the detected position data D1 stored in the storage unit 14, performs processing that determines data after increasing the value of the detected position data D1 by the value d from the initial value, and stores time data associated with the data as time $T_1$ in the storage unit 14. Similarly, the arithmetic unit 11 evaluates the detected position data D12 stored in the storage unit 14, performs processing that determines data after increasing the value of the detected position data D12 by the value d from the initial value, and stores time data associated with the data as time $T_2$ in the storage unit 14.

The delay time of the signal included in the data string of the detected position data D12 is calculated from time ΔT which is the difference between the values of time $T_2$ and time $T_1$. A value obtained by subtracting the delay time from each value of the time data string associated with the detected position data D12 is updated as a value of the time data associated with the detected position data D12. As a result, the time delay included in the detected position data D12 and the data of the measured signal S is corrected, and the time data associated with the measured signal S represents the correct time when the measured signal S is measured by the measuring instrument 60, namely the time not including any delay, whereby it is possible to compare values of the data communicated between the numerical control unit 10 and the drive control unit 20a as with the detected position data D1 and a command position.

As described above, the present embodiment can correct the delay of the data of the measured signal and acquire the data in synchronization with the correct time. The present embodiment can also perform measurement without increasing the communication load on the communication line even at the time of simultaneously measuring a plurality of different measured signals by using a plurality of measuring instruments.

In the first embodiment, the arithmetic unit 21 of the drive control unit 20 generates the indicator signal data D2 and communicates it to the numerical control unit 10 and the signal measurement unit 50, whereas the present embodiment communicates the detected position data D1 to the numerical control unit 10 and the signal measurement unit 50. The sensor 32 acquires the quantity of state, the value of which being the detected position data D1 is then used instead of the indicator signal data of the first embodiment, so that the numerical control apparatus according to the present embodiment does not require processing of generating and communicating the indicator signal data D2 in a program that operates the arithmetic unit 21a of the drive control unit 20a, and can reduce the number of data stored in the storage unit 14 of the numerical control unit 10.

Third Embodiment

In the first and second embodiments, the data of the measured signal stored in the storage unit of the numerical control unit is associated with the time data indicating the correct time when the measured signal is measured, where the data string of the measured signal S is stored at time intervals different from that of another data string stored by the numerical control unit. Here, the other data string can be data related to a command position or the detected position data D1. In order for the numerical control unit to calculate a correction parameter which more accurately controls the movement of a control target by using the data of the measured signal S, the data of the measured signal S is desirably associated with time data that is associated with the detected position data D1.

Figure 5:
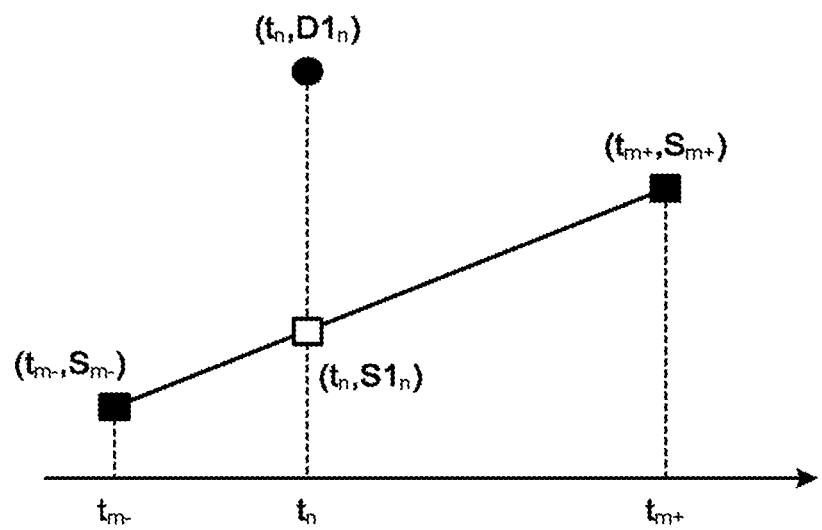
FIG. 5 is an enlarged view illustrating plots of data of a measured signal and detected position data with a horizontal axis representing time, and illustrating points before and after time $t_n$ among time data associated with the detected position data, according to a third embodiment.

FIG. 5 is an enlarged view illustrating plots of the data of the measured signal S and the detected position data D1 with a horizontal axis representing time, and illustrating points before and after time $t_n$ that is one of the time data associated with the detected position data D1. FIG. 5 will be used to describe a method of calculating data of a measured signal 31, which shares the time data with the detected position data D1, from the data of the measured signal S.

In FIG. 5, a point $(t_n, D1_n)$ indicated by a black circle is a plot of the value of the detected position data D1 at time $t_n$, and points $(t_{m-}, S_{m-})$ and $(t_{m+}, S_{m+})$ indicated by black squares are plots of the data values of the measured signal S at time $t_{m-}$ which is earlier than time $t_n$ and closest to time $t_n$ and time $t_{m+}$ which is later than time $t_n$ and closest to time $t_n$ among the time data associated with the data of the measured signal S, respectively. A point $(t_n, S1_n)$ indicated by an open square in FIG. 5 is a point at time $t_n$ on a line segment connecting the points $(t_{m-}, S_{m-})$ and $(t_{m+}, S_{m+})$. According to the geometrical relationship in FIG. 5, $S1_n$ is represented by the following expression (1).

[Expression 1]

$$S1_n = S_{m-} + \frac{(t_n - t_{m-})(S_{m+} - S_{m-})}{t_{m+} - t_{m-}} \quad (1)$$

The data string of the measured signal S1 obtained by performing calculation of the above expression (1) with respect to the detected position data D1 and all the time data associated with the detected position data D1 is obtained by resampling the data of the measured signal S so as to share the time data with the detected position data D1. Storing the data string of the measured signal S1 in the storage unit 14 allows the numerical control unit 10 to utilize the data of the measured signal S1 and calculate the correction parameter for more accurately controlling the movement of the control target 40.

The numerical control unit of the present embodiment further includes a display unit not illustrated in FIGS. 1 and 3, where the display unit displays a combination of one or more data strings stored in the storage unit.

FIG. 6 is a table data illustrating combinations of the time data, the detected position data D1, and the data of the measured signal S1 being resampled that are stored in the storage unit 14. Note that these data may each be plotted with respect to the associated time data and displayed as a graph, as illustrated in FIGS. 2 and 4.

The numerical control unit of the present embodiment includes a third input/output unit not illustrated in FIGS. 1 and 3, where the third input/output unit compiles a plurality of data strings being combined above into a single data file and outputs the file to an external storage medium. Here, the external storage medium can be a flash memory.

As described above, the numerical control apparatus of the present embodiment can easily perform calculation processing by using the data of the measured signal S to correct the control parameter. Moreover, the data of the synchronized measured signal 31 is displayed along with another data to make it easy for an operator performing maintenance and adjustment to evaluate the data of the acquired measured signal S on the spot. The data is also output as a data file to enable an offline analysis operation using a personal computer.

Note that although the numerical control apparatus described in the first to third embodiments exemplifies the configuration in which the components perform communication via the communication line, the present invention is not limited to such example but may perform wireless communication between the components.

The configuration illustrated in the aforementioned embodiments merely illustrates an example of the content of the preset invention, and can thus be combined with another known technique or partially omitted and/or modified without departing from the gist of the
Reference Signs List

10 numerical control unit, 11, 21, 21*a*, 51 arithmetic unit, 12, 22, 22*a* first input/output unit, 13, 23, 23*a* second input/output unit, 14, 54 storage unit, 15 timer, 20, 20*a* drive control unit, 24, 24*a* detected value input unit, 25, 25*a* inverter circuit, 30 drive device, 31 drive unit, 32 sensor, 40 control target, 50 signal measurement unit, 52 signal input unit, 53 signal output unit, 60 measuring instrument, and 100, 100*a* numerical control apparatus.

The invention claimed is:

1. A numerical control apparatus comprising:
a numerical controller that generates a command position for a control target with a measuring instrument;
a drive controller connected to the numerical controller via a first communication line; and
a signal detector connected to the numerical controller via a second communication line, and connected to the drive controller via a third communication line, wherein
the drive controller generates a command controlling a driver connected to the control target such that the control target follows the command position, and generates indicator signal data to be outputted to the numerical controller via the first communication line and at the same time to the signal detector via the third communication line, and the numerical controller includes a processor that performs processing of acquiring the indicator signal data as first indicator signal data via the first communication line and as second indicator signal data via the signal detector and the second communication line, comparing the first indicator signal data and the second indicator signal data, calculating a communication delay of the second indicator signal data with respect to the first indicator signal data, and determining input time of a measured signal from the measuring instrument, wherein
the signal detector receives the indicator signal data directly from the drive controller along with the measured signal, and
the numerical control apparatus is connected to a driver apparatus, the driver apparatus including the driver and a sensor, the sensor being different than the signal detector, to detect a quantity of state of position, speed, and current of the driver and output the quantity of state to the drive controller, and
the drive controller acquires the quantity of state from the sensor and pulses the indicator signal data when triggered by a change in the quantity of state or a change in the command position acquired from the numerical controller, wherein
the driver of the driver apparatus is different than the control target and the measuring instrument and the sensor of the driver apparatus is different than the control target and the measuring instrument.

2. The numerical control apparatus according to claim 1, wherein
the drive controller includes:
a first transceiver that outputs the first indicator signal data to the numerical controller via the first communication line; a second transceiver that outputs the second indicator signal data to the signal detector via the third communication line, and
the second transceiver includes a digital-to-analog converter that outputs the second indicator signal data as an analog value.

3. The numerical control apparatus according to claim 1, wherein
the signal detector includes:
a signal receiver that includes an analog-to-digital converter that acquires a plurality of analog signals at a fixed sampling period, converts the plurality of analog signals into digital signals, and outputs the digital signals;
a memory that stores the digital signals as a set for each period of the sampling period; and
a signal transmitter that outputs the digital signals stored in the memory to the numerical controller every communication cycle of the second communication line, and
the plurality of analog signals includes the second indicator signal data that is output as the analog data from the second transceiver of the drive controller.

4. The numerical control apparatus according to claim 1, wherein a data value of a measured signal that shares associated time data with the detected position data is calculated from data of the measured signal acquired by the numerical controller.

5. The numerical control apparatus according to claim 4, wherein the data of the measured signal synchronized with the time data and at least one or more of the indicator signal data, the detected position data, and data of the command position are combined and displayed, or outputted as a data file.

6. A method for controlling a control target, comprising:
generating, via a numerical controller, a command position for the control target with a measuring instrument;
generating, via a drive controller connected to the numerical controller via a first communication line, a command controlling a driver connected to the control target such that the control target follows the command position, and generating indicator signal data to be outputted to the numerical controller via the first communication line and at the same time to be outputted to a signal detector, the signal detector connected to the numerical controller via a second communication line, the signal detector connected to the drive controller via a third communication line;
acquiring, via the numerical controller, the indicator signal data as first indicator signal data via the first communication line and as second indicator signal data via the signal detector and the second communication line;
comparing, via the numerical controller, the first indicator signal data and the second indicator signal data;
calculating, via the numerical controller, a communication delay of the second indicator signal data with respect to the first indicator signal data; and
determining, via the numerical controller, input time of a measured signal from the measuring instrument, wherein
the signal detector receives the indicator signal data directly from the drive controller along with the measured signal, and
a sensor different than the signal detector detects a quantity of state of position, speed, and current of the driver and outputs the quantity of state to the drive controller, and
the drive controller acquires the quantity of state from the sensor and pulses the indicator signal data when triggered by a change in the quantity of state or a change in the command position acquired from the numerical controller, wherein
the driver is different than the control target and the measuring instrument and the sensor is different than the control target and the measuring instrument.

* * * * *